United States Patent [19]
Tao et al.

[11] Patent Number: 5,796,609
[45] Date of Patent: Aug. 18, 1998

[54] METHOD AND APPARATUS FOR INTERNAL MODEL CONTROL USING A STATE VARIABLE FEEDBACK SIGNAL

[75] Inventors: Kuoting Mike Tao, Campbell; Xiaohua George He, Menlo Park, both of Calif.

[73] Assignee: Honeywell-Measurex Corporation, Cupertino, Calif.

[21] Appl. No.: 713,462

[22] Filed: Sep. 13, 1996

[51] Int. Cl.$^6$ ................................................. G05B 13/02
[52] U.S. Cl. ............................ 364/164; 364/165; 364/150
[58] Field of Search .................... 364/148–177; 123/357, 446; 318/561

[56] References Cited

U.S. PATENT DOCUMENTS

| | | | |
|---|---|---|---|
| 3,610,899 | 10/1971 | Dahlin | 235/151.35 |
| 4,346,433 | 8/1982 | Rutledge | 364/162 |
| 4,368,510 | 1/1983 | Anderson | 364/151 |
| 4,407,013 | 9/1983 | Arcara et al. | 364/149 |
| 4,423,594 | 1/1984 | Ellis | 60/39.28 |
| 4,578,747 | 3/1986 | Hideg et al. | 364/151 |
| 4,602,326 | 7/1986 | Kraus | 364/158 |
| 4,646,226 | 2/1987 | Moon | 364/176 |
| 4,707,779 | 11/1987 | Hu | 364/148 |
| 4,805,126 | 2/1989 | Rodems | 364/571.01 |
| 4,814,968 | 3/1989 | Fukumoto | 364/150 |
| 4,893,262 | 1/1990 | Kalata | 364/567 |
| 5,121,332 | 6/1992 | Balakrishnan et al. | 364/471 |
| 5,483,439 | 1/1996 | Ono et al. | 364/165 |
| 5,539,634 | 7/1996 | He | 364/158 |
| 5,609,136 | 3/1997 | Tuken | 364/164 |

OTHER PUBLICATIONS

"A Linear Programming Approach to Constrained Multivariable Process Control" by C. Brosilow et al., Control and Dynamic Systems, vol. 27, System Identification and Adaptive Control, 1988, Academic Press, Inc., pp. 141, 148 and 149.

"A Simple Adaptive Smith–Predictor For Controlling Time–Delay Systems" by A. Terry Bahill, Control Systems Magazine, May 1983, pp. 16–22.

"Theory and Problems of Feedback and Control Systems" by Joseph J. Distefano, III, Ph.D et al., 1967, McGraw–Hill, Inc., Chapter 2, pp. 13 and 14.

"Multivariable Internal Model Control for a Full–Scale Industrial Distillation Column," by J.M. Wassick and R. Lal Tummala, IEEE Control Systems Magazine, 1989, pp. 91–96.

"Method For Automatic Adaptation of the Time Constant For a First Order Filter", from the Industrial and Engineering Chemistry Research, No. 29, 1991, pp. 275–277.

*Primary Examiner*—Reba I. Elmore
*Assistant Examiner*—Steven R. Garland
*Attorney, Agent, or Firm*—Burns, Doane, Swecker & Mathis, LLP

[57] ABSTRACT

The present invention relates generally to the control of processes which include relatively long time delays, yet which are susceptible to transient external disturbances, such as high-speed sheetmaking processes. Exemplary embodiments include a control system architecture that combines internal model-based control with state feedback in a manner which provides robust control, yet provides rapid rejection of external transient disturbances even in processes including relatively long time delays.

9 Claims, 5 Drawing Sheets

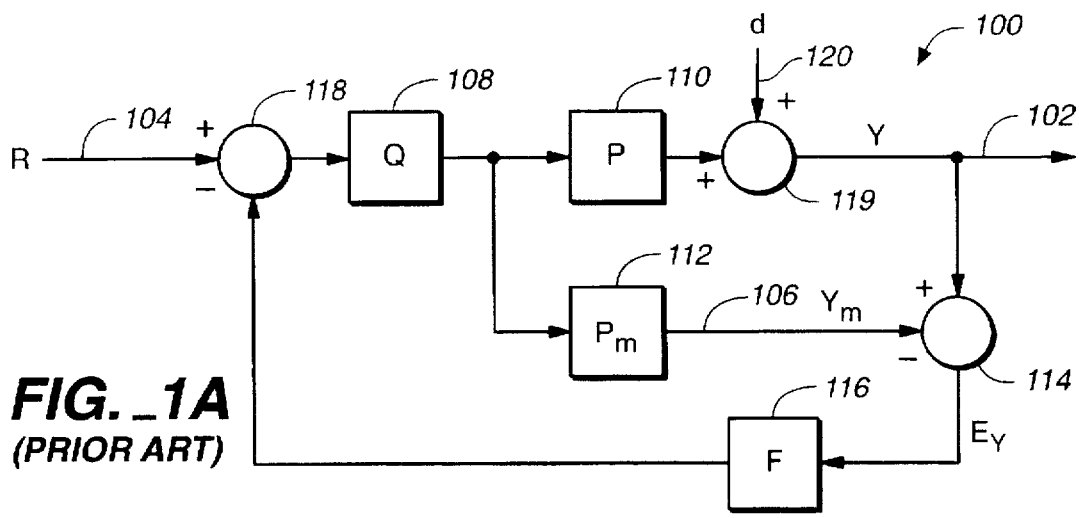
FIG._1A (PRIOR ART)
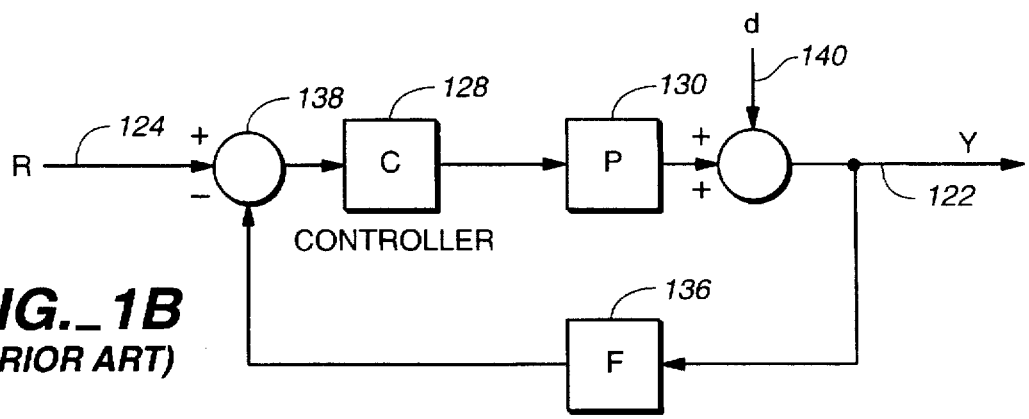
FIG._1B (PRIOR ART)
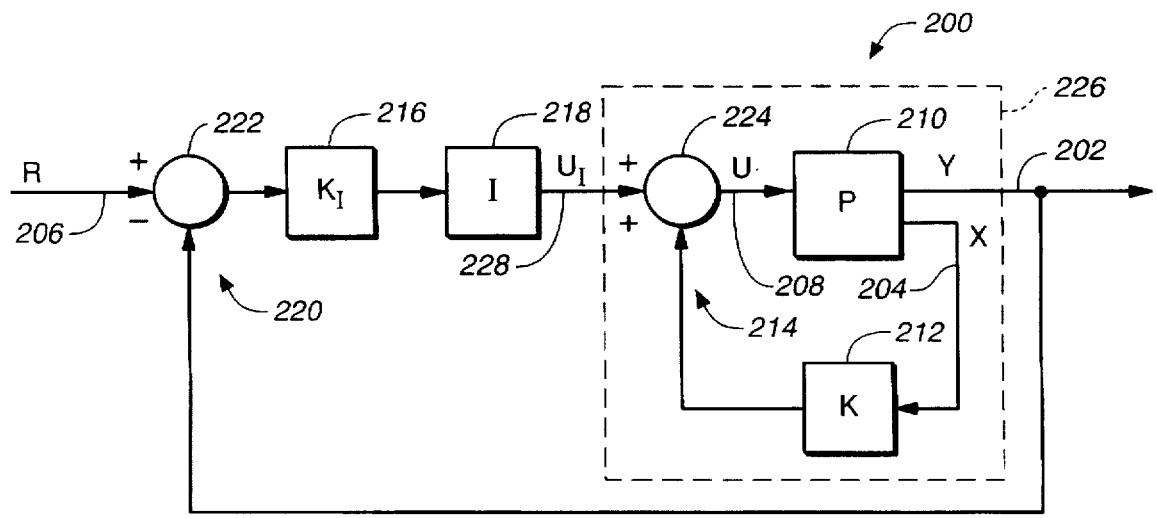
FIG._2 (PRIOR ART)

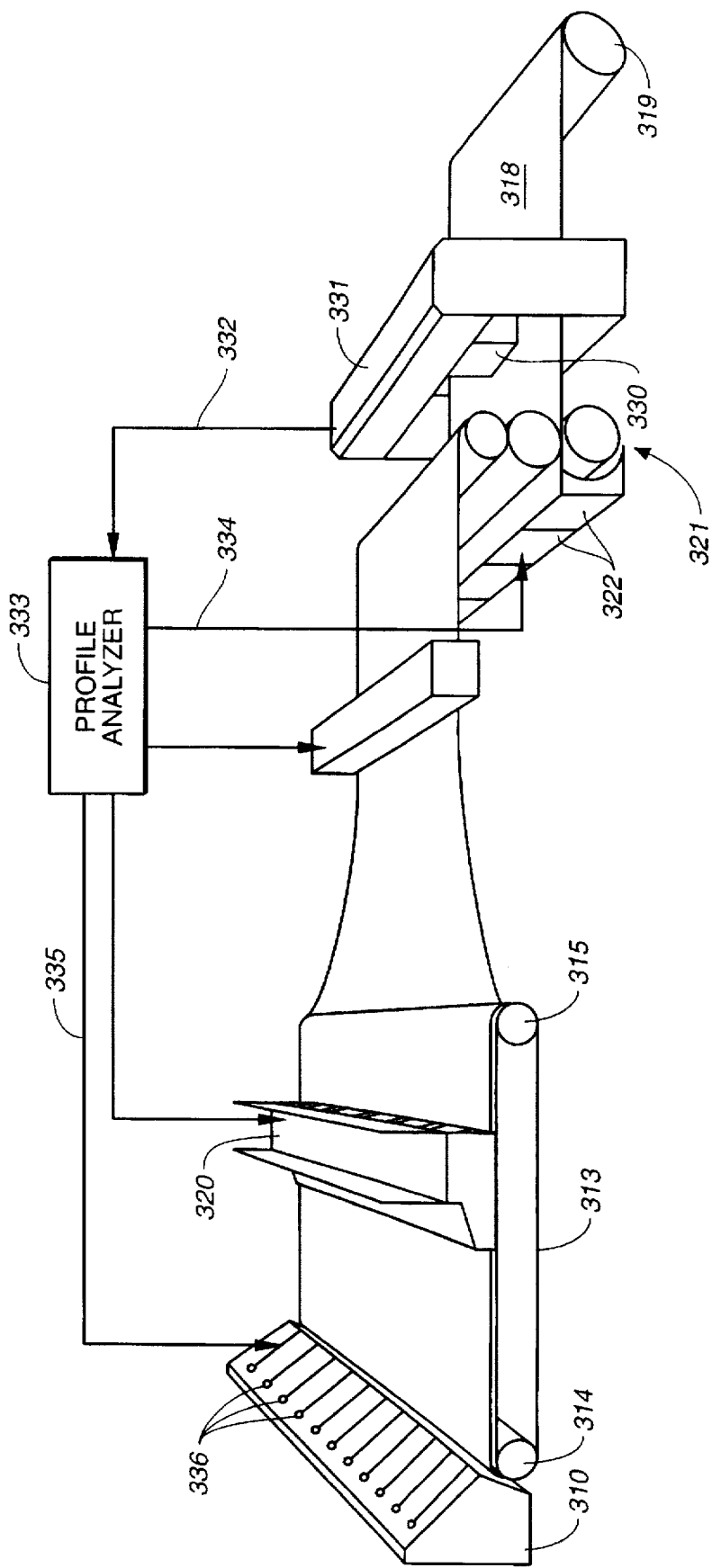
FIG._3

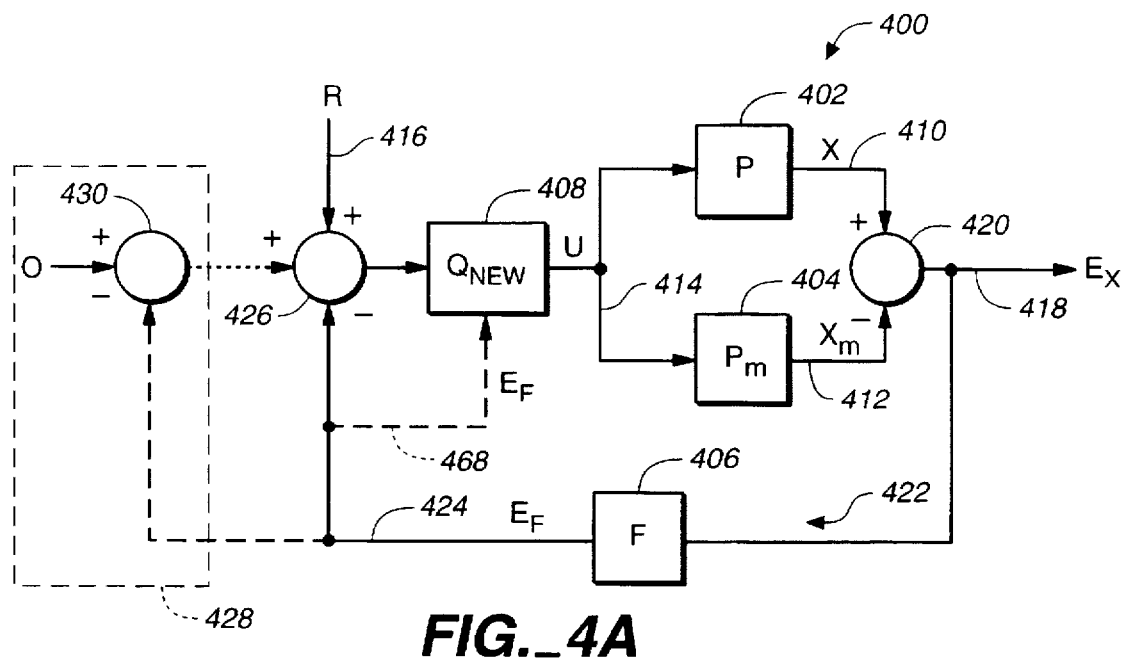
FIG._4A
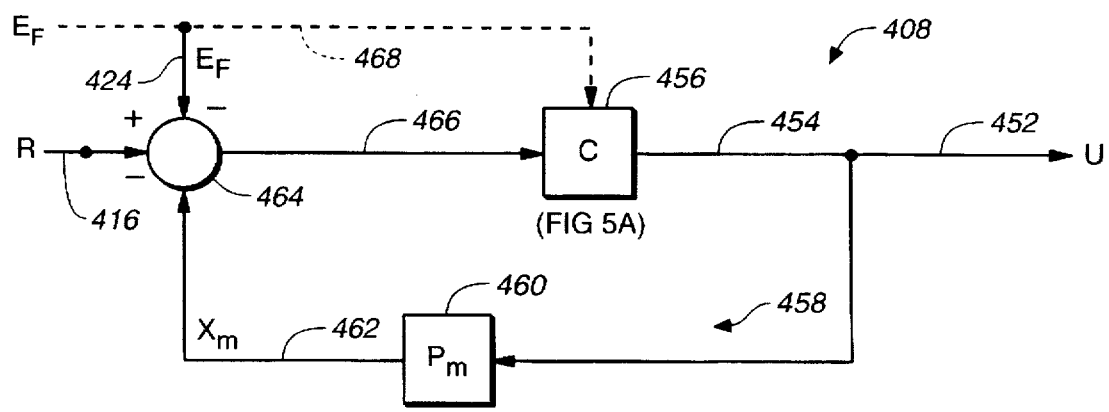
FIG._4B

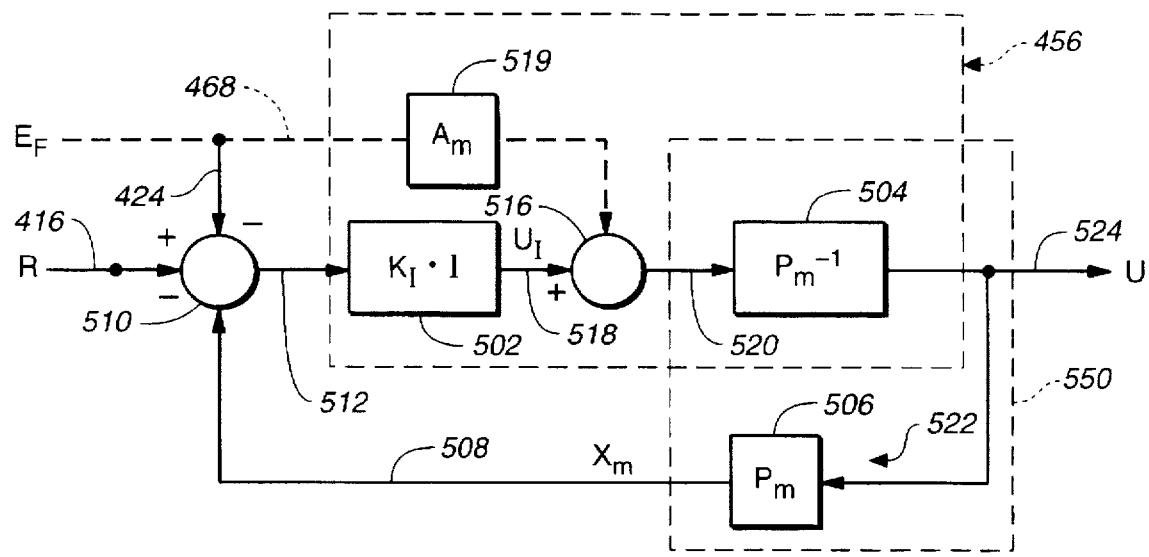
FIG._5A
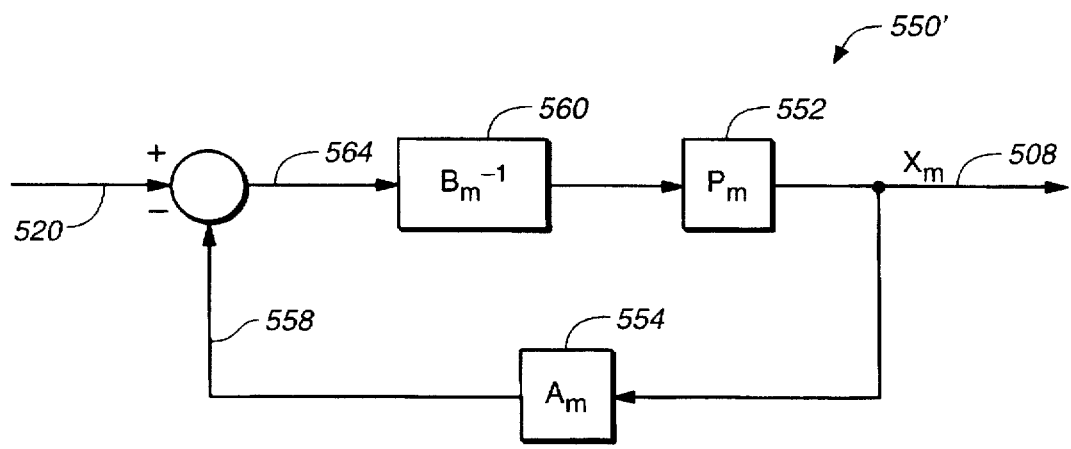
FIG._5B

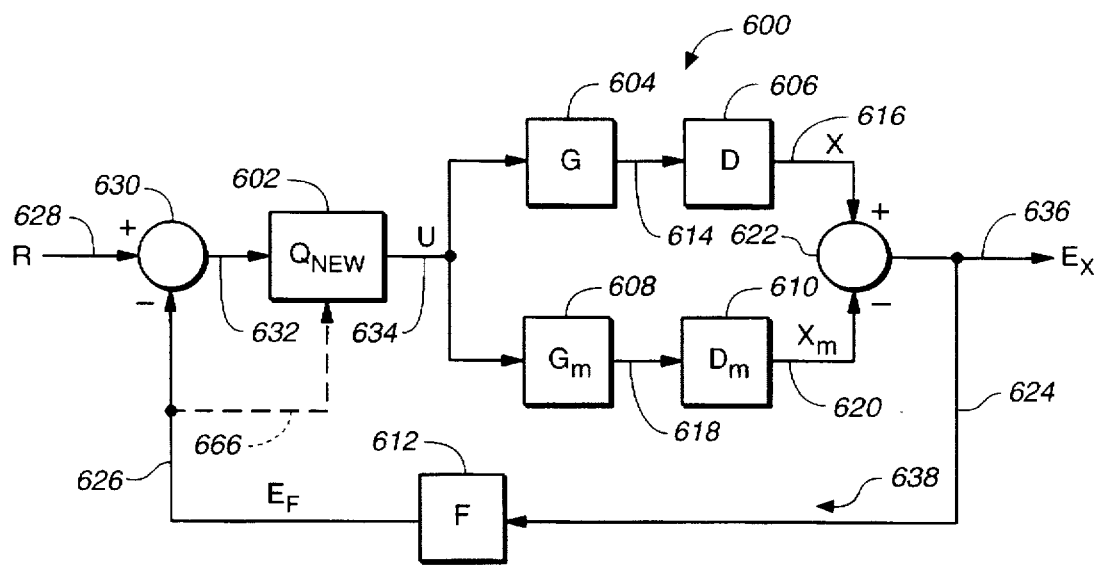
FIG._6A
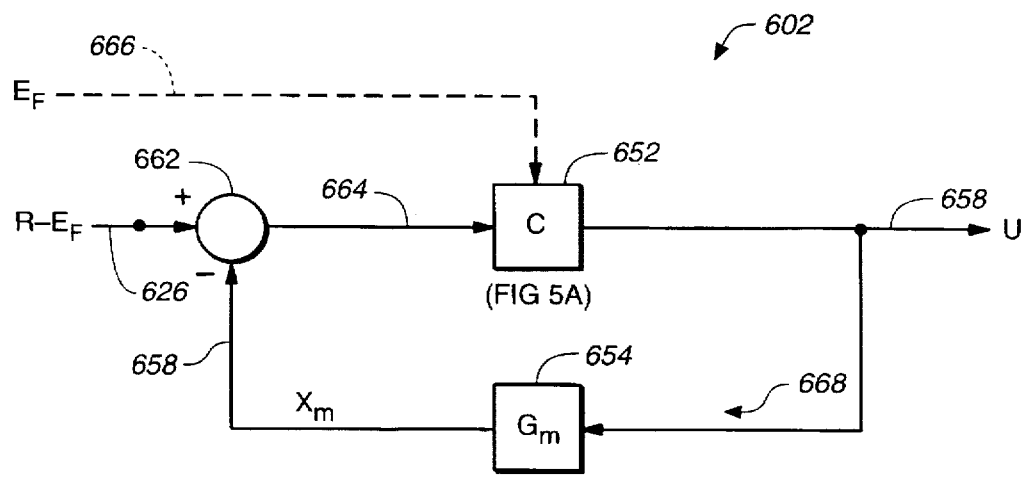
FIG._6B

5,796,609

1

METHOD AND APPARATUS FOR INTERNAL MODEL CONTROL USING A STATE VARIABLE FEEDBACK SIGNAL

BACKGROUND OF THE INVENTION

1. Field of the Invention:

The present invention generally relates to the control of processes, such as papermaking processes, using internal model control (IMC).

2. State of the Art:

Industrial control systems which employ an internal model control (IMC) structure are known. For example, one such system is described in an article entitled, "Multivariable Internal Model Control for a Full-Scale Industrial Distillation Column," by J. M. Wassick and R. Lal Tummala, IEEE Control Systems Magazine, 1989, pp. 91–96. The Smith-Predictor control scheme, often used to control processes with long delays, also belongs to this category.

FIG. 1A illustrates a functional block diagram 100 of a standard IMC control system. The output 102 of the process contaminated by external disturbance, d, is labelled with the vector Y, the input 104 to the control system is labelled with the vector R, and the predicted output 106 of an internal process model is labelled with the vector $Y_m$. In FIG. 1A, a controller 108 is labelled Q, the dynamic process 110 is labelled P, a model of the process 112 is labelled $P_m$, and a low pass filter 114 is labelled F.

The IMC controller Q is typically designed in such a way that it basically "inverts" the model $P_m$ (and hopefully the process P). The idea is when $P_m$=P and d=0, Y=R. The error represented by $E_y$, where $E_y$=Y−$Y_m$, is fed back from comparator 114 through a low pass filter 116 to produce a filtered error signal $E_F$ which is subtracted from the system input 104 at comparator 118. The vector difference R−$E_F$ is then used as the input to the controller 108. The output of controller 108 is directed to both the dynamic process 110 and the model 112 in parallel. The feedback of the error signal $E_F$ provides correction for errors due to mismatches between process model and actual process, and to any external disturbance, d.

Contrasting the IMC control with a conventional feedback control system as depicted in FIG. 1B, there are apparent differences. In FIG. 1B, the conventional feedback controller 128 is labelled C and has a different structure from the IMC controller 108, labelled Q in FIG. 1A. One difference between the systems of FIG. 1A and FIG. 1B is that the conventional (output) feedback control system does not explicitly possess an internal model of the controlled process. Consequently, unlike the IMC which uses the model output error $E_Y$ for feedback, the feedback signal for the conventional feedback control is derived from the measured process output alone.

It has been asserted that IMC provides a control comparable to that of an experienced operator. An experienced operator uses a mental model of the process based on personal experience. By comparing instrument readings with the expected process response, faulty instruments or large process disturbances can be identified and responded to accordingly. Thus, IMC has been considered more intuitive than the conventional feedback scheme.

Other desirable features credited to IMC include: ease of handling actuator saturation and bumpless manual/auto transfer, the use of error filter 116 in FIG. 1A for (stability) robustness, the ability to control processes with long time delays (the Smith predictor form), and the provision of

2 reasonable setpoint control even without the outer loop sensor feedback.

Alternate control systems do, of course, exist for controlling the operation of high-speed processes in a manner which quickly rejects external disturbances. One such scheme is known as state feedback control, which is the heart of so-called modern control theory. The state vector of a process is (mathematically) a complete description of the state of the process being controlled. An actual process output may constitute a portion of the process state, or may be a lower dimensional transformation of the complete process state. For example, oscillatory processes would typically require, in addition to the process output, rate of change and perhaps even higher-order derivatives as state variables. The state feedback scheme generalizes conventional (output) feedback by feeding back all the state variables necessary to describe the process dynamics. Feeding back all the state variables of the process, in theory, can achieve fuller and faster control of the process than can be done with output-only feedback. In practice, depending on whether all the state variables are directly measurable or not, the performance may vary. FIG. 2 illustrates a simplified block diagram 200 of a state feedback control system. In FIG. 2, a vector output 202 of the process is labelled Y, a state vector 204 of the system is labelled X, a vector input 206 is labelled R, and a control vector 208 is labelled U. In FIG. 2, the dynamic process 210 is labelled P, a feedback gain matrix 212 in an inner state feedback loop 214 is labelled K, an integral gain 216 is labelled $K_I$ and an integrator 218 is labelled I.

In the FIG. 2 control system, the measured process output 202 is applied as negative feedback through outer feedback loop 220 to a comparator 222. The integral gain 216 receives the difference between the process output 202 and the input 206. An output from gain 216 is then integrated by integrator 218 to provide an output $U_I$. Inner loop gain matrix 212 is applied to the state feedback vector 204 to produce an input at comparator 224 which is subtractively combined with the output of integrator 218 to provide a control vector U. The process 210 is conventionally modeled as X←A(x)+B(u) and Y←C(x).

In FIG. 2, only the inner state feedback loop 214 is the true state feedback. Based on the process output measurement, an outer feedback loop 220 is provided with an integral controller to erase any output bias that may result from persistent external disturbances and non-zero mean setpoint changes. Comparing FIG. 2 with FIG. 1B, it is clear that the state feedback control has an additional tight inner loop feedback that is lacking in the conventional output feedback scheme. It also becomes clear that the IMC structure in FIG. 1A does not employ state feedback either, because the only true feedback for IMC is the output feedback loop via $E_Y$.

In spite of the apparent advantage of faster response provided by using state feedback, however, state feedback control is not widely used to control industrial processes. One of the key reasons is that often the state variables are not directly measurable, and using model-based state estimators in lieu of direct measurements tends to add another layer of modelling uncertainty and lead to possible performance variations. The IMC structure, on the other hand, as discussed earlier, has many attractive features for industrial users, including the ability to control processes with long time delays and robustification from error filtering, and so forth.

Thus, it would be desirable to provide control systems and methods that combine the advantages from state feedback and from IMC. That is, control systems that can rapidly reject transient disturbances in processes which include relatively long time delays, such as sheetmaking processes, without sacrificing robustness and stability; and which are friendly to an industrial user.

SUMMARY OF THE INVENTION

The present invention relates generally to the control of processes which include relatively long time delays, yet which are susceptible to transient external disturbances, such as high-speed sheetmaking processes. Exemplary embodiments comprise a control system architecture that combines internal model control (IMC) with state feedback in a manner which provides robust control, yet provides rapid rejection of external transient disturbances even in processes including relatively long time delays.

More particularly, exemplary embodiments relate to an apparatus, and associated method, for controlling a process, the apparatus comprising means for providing at least one control signal in response to at least one setpoint reference signal, said providing means including at least one integration function; means for modeling a process to be controlled, and for outputting a predicted process output signal in response to said at least one control signal; and means for producing an error signal between a process output signal and said predicted process output signal, said error signal being a first input to said providing means to modify said at least one setpoint reference signal, and said error signal being a second input to said providing means to modify an output of said integration function.

Additionally, exemplary embodiments relate to an apparatus, and associated method, for controlling a process, the apparatus comprising means for providing at least one control signal in response to at least one setpoint reference signal, said providing means including at least one integration function, means for modeling a process to be controlled, and for outputting a predicted process output signal in response to said at least one control signal; and means for producing an error signal between a process output signal and said predicted process output signal, said error signal being a state feedback signal of said process.

BRIEF DESCRIPTION OF THE DRAWINGS

The present invention can be further understood by reference to the following description and attached drawings which illustrate exemplary preferred embodiments of the present invention. In the drawings:

FIG. 1A is a functional block diagram of a known control system which uses standard internal model control (IMC);

FIG. 1B is a functional block diagram of a known control system which uses conventional (output) feedback control;

FIG. 2 is a functional block diagram of another known control system which uses state feedback;

FIG. 3 is an example of a conventional sheetmaking machine;

FIG. 4A is a functional block diagram of an exemplary internal modelbased control system according to the present invention;

FIG. 4B is a functional block diagram of the controller of FIG. 4A according to an exemplary embodiment of the present invention;

FIG. 5A is a functional block diagram of a portion of the FIG. 4B controller according to an exemplary embodiment of the present invention;

FIG. 5B is a functional block diagram of an exemplary alternate embodiment of a portion of the FIG. 5A functional block diagram;

FIG. 6A is a function block diagram of an exemplary alternate embodiment of the present invention; and FIG. 6B is a functional block diagram of the controller of FIG. 6A according to an exemplary embodiment of the present invention.

DETAILED DESCRIPTION OF THE PREFERRED EMBODIMENTS

FIG. 3 shows an example of a process which can be controlled in accordance with exemplary embodiments of the present invention. More particularly, FIG. 3 shows a conventional machine for producing continuous sheet material. The sheetmaking machine includes a feed box 310 which discharges raw material, such as paper pulp, onto a supporting web 313 trained between rollers 314 and 315. Further, the sheetmaking machine includes various processing stages, such as a calendering stack 321, which operate upon the raw material to produce a finished sheet 318 which is collected onto a reel 319. In modern high-speed sheetmaking machines, such as papermaking machines, typical sheet velocities are about ten to fifteen inches per second.

In conventional sheetmaking practice, the processing stages along the machine of FIG. 3 each include actuators for controlling the properties of sheet 318 at adjacent cross-directional locations, often referred to as "slices." Thus, for example, calendering stack 321 includes actuators 322 for controlling the compressive pressure applied to sheet 318 at various slice locations. In the following, the various actuators are referred to collectively as profile actuators. The profile actuators normally are independently adjustable.

Further in the system of FIG. 3, at least one on-line sensor 330 is mounted on the sheetmaking machine to provide control information (i.e., measurements of a selected sheet property) for operating the profile actuators. In the papermaking art, on-line sensors are well known for detecting variable sheet properties such as basis weight, moisture content, ash content, and caliper. In the illustrated embodiment, on-line sensor 330 is a scanning sensor mounted on a cross-directional supporting frame 331 which extends across the sheetmaking machine. Further, sensor 330 provides signals to a profile analyzer 333 via signal path 332. The signals indicate the magnitude of the measured sheet property at various cross-directional measurement points. In turn, profile analyzer 333 is connected to control the profile actuators at the various processing stages of the sheetmaking machine. For example, signal path 334 carries control signals from profile analyzer 333 to the profile actuators at calender stack 321, and signal path 335 carries control signals to profile actuators 336 at feedbox 310.

It should be understood that profile analyzer 333 can be a conventional signal processor that includes a control system which operates in response to sheet measurements. One example of such an analyzer is the Mini-Slice™ signal processor available from Measurex Corporation of Cupertino, California.

In operation, sensor 330 periodically traverses sheet 318 in the cross direction at generally constant speed while measuring sheet properties. It should be noted that there are unavoidable delays between the time the sheet is operated upon by the profile actuators and the time the sheet properties are measured. In the case of the calendar profile actuators 322, for instance, the delay is due, at least in part, to the time required for sheet 318 to travel from calendar stack 321 to sensor 330.

FIG. 4A illustrates a functional block diagram of an exemplary control system which can be used in conjunction with the FIG. 3 process to replace the FIG. 1 control system in accordance with the present invention. FIG. 4A illustrates a control system 400 which combines internal model control (IMC) with state feedback. FIG. 4A illustrates a dynamic process 402, labelled P, an internal model 404 of the process, labelled $P_m$, a low pass filter 406, labelled F, and a controller 408, labelled $Q_{NEW}$. As illustrated, P and $P_m$ are in a parallel relationship. In FIG. 4A, the output 410 of P provides a vector X, the output 412 of $P_m$ provides a vector $X_m$, and the control input 414 to P and $P_m$ is labelled with the vector U. The control input 414 is derived from a setpoint input 416, labelled R.

To simplify the following discussion, the process P and process model $P_m$ in FIG. 4A will be thought of as first-order processes. This simplification is applicable to many industrial processes which can often be described as interacting first-order processes or first-order plus time delay processes. For ease of discussion, the notion of a time delay will be reserved until a discussion of FIG. 6. Notice that with a first-order assumption, the process state X and model state $X_m$ can be thought of as the same as the process output measurement Y and model output $Y_m$. In other words, the process state X is now directly measurable. As those skilled in the art will further appreciate, however, control systems according to the present invention can be readily configured to use state feedback in an IMC structure for processes of higher order. For such systems, the state variables will be either directly measurable or estimated using any state estimation devices known in the art, such as the known Kalman filter.

As illustrated in FIG. 4A, a model state vector $X_m$ from internal process model 404 is subtracted at comparator 420 from the state vector X to generate a state error 418 labelled with the state vector $E_x$, where $E_{x=X-Xm}$. This differential state vector Ex is fed back through an outer feedback loop 422 to a conventional filter 406, such as a lowpass filter. Alternately, a high-performance nonlinear filter such as the one described in copending U.S. application Ser. No. 08/713,473 (Attorney Docket No. 018028-175), entitled, "Method and Apparatus for Nonlinear Exponential Filtering of Signals", filed on even date herewith, the contents of which are hereby incorporated by reference in their entirety, can be used. The filter output 424, labelled $E_F$, is subtractively combined at the adder 426 to the setpoint input 41 6. The filtered error signal $E_F$ is additionally fed directly to controller 408 via a bypass path 468 in a manner to be described more fully with respect to FIG. 4B. Controller 408 receives the vector output of adder 426 and produces the control input 414, labelled vector U. As described above, control vector U is then input to both dynamic process 402 and process model 404.

An alternative embodiment of the functional block diagram of FIG. 4A is represented in FIG. 4A by inclusion of the broken line 428. As illustrated in FIG. 4A, the filtered state error $E_F$ can be subtracted at comparator 430 from a null 0 (instead of at comparator 416). The vector output from comparator 430, representing the amount by which the error signal $E_F$ differs from a 0 reference, is then combined at the adder 426 to the setpoint input 416. The output of adder 426 is then a modified setpoint input to controller 408.

FIG. 4B illustrates a functional block diagram of an exemplary embodiment of controller 408 in FIG. 4A. FIG. 4B illustrates that the controller Q includes a control portion 456, labelled C, and a process model 460, labeled $P_m$ which is modelled identically to model 404 of FIG. 4A. As illustrated in FIG. 4B, C is in the forward path of the controller Q, while $P_m$ is in an internal feedback path of controller Q.

The output 454 of C is the output 452 of the controller Q and is labeled U. The output 462 of $P_m$ is a state vector labeled $X_m$. The controller output is fed back through feedback loop 458 to the process model 460, the output 462 of which is the model state vector $X_m$ which is subtractively combined with a signal 424, labeled $R-E_F$, at comparator 464. The output 466 of comparator 464 is input to the control portion C. In accordance with the exemplary embodiments of the present invention, the filtered error signal $E_F$ is additionally fed around comparator 464 directly to control portion 456 via a bypass path 468. Recalling that with the first-order assumption. $E_F$ is now the filtered state error, the inclusion of this bypass provides an ability to use state feedback in conjunction with internal model control, since it enables complete feedback of the state vector. That is, it enables the model state feedback signal $X_m$ to be added to any deviation from the measured process state, X, that resulted in $E_F$ (which is derived from $X-X_m$) being non-zero.

In FIG. 5A, the forward path which is enclosed by the dashed box illustrates an exemplary embodiment of the FIG. 4B control portion 456, labelled as C, according to the present invention. In FIG. 5A, an integral control 502 is labelled $K_I \cdot I$; the process model 506 is labelled $P_m$, and an approximate implementation of the process model inverse 504 is labelled $P_m^{-1}$. The integral control 502 and the (approximate) inverse model 504 together produce the (control) output 524, labelled U. This control output U feeds the process model 506 in the feedback path whose output 508 closes the negative feedback path 522. This control output U is also the same U found in FIGS. 4A and 4B (414 and 452, respectively).

In operation, the setpoint 416, labelled R, is differentially combined with the state error vector 424, labelled $E_F$, to form the command signal for the feedback loop 522. According to the present invention, supplemental bypass path 468 bypasses the integral control 502 and feeds the state error vector, $E_F$, through a matrix gain block 519, labelled $A_m$, directly to adder 516. The gain matrix $A_m$ is a state transition matrix of the process model 506, labelled $P_m$. The equation of the model state transition is: $X_m \leftarrow S_m * X_m + B_m * U$.) Adder 516, being downstream of the integral control 502, differentially combines the integral control output 518, labelled $U_I$, with the forward feeding state error vector $E_F$ via path 468.

As those skilled in the art will appreciate, supplementing the loop command with a forward feeding path which bypasses an integral control would significantly speed up the loop response. Therefore, by using the same filtered state error vector $E_F$ to supply an input both through and around the integral control 502, exemplary embodiments of the present invention enhance the response speed of the standard IMC.

Recall that in the state feedback scheme of FIG. 2, the state (inner loop) feedback 214 is differentially combined with the integral control output 228, labelled $U_I$. This differential combination 224 in FIG. 2 is analogous to the differential combination taking place at adder 516 in FIG. 5A, where the integral control output 518 is subtractively combined with the state error vector $E_F$. This qualitatively suggests that the inclusion of the forward path 468 in FIG. 5A effectively includes state feedback in the IMC structure.

This statement is also quantitatively correct by considering an alternate embodiment 550' of FIG. 5B which illustrates the contents of block 550 in a comparable, but mathematically different way. FIG. 5B illustrates a state feedback loop without the outer integral control loop 220 of FIG. 2. That is, the embodiment 550' of FIG. 5B represents an alternate representation of block 226 in FIG. 2 with two exceptions. First, the state feedback in 550' uses two matrix gains, one in the feedback path, labelled $A_m$ and the other one in the forward path, labelled $B_m^{-1}$ to accomplish the state feedback task. By contrast, in FIG. 2 only one matrix gain 212, labelled K is used in the feedback path. Secondly, in FIG. 2 the real process 210, labelled P, is the object of control, whereas in FIG. 5B, a process model 552, labelled $P_m$ is the object of control.

Recall that $A_m$ and $B_m$ are the state transition matrix and the input gain matrix in the model state transition equation described earlier and $B_m^{-1}$ stands for the inverse of $B_m$. As those skilled in the art will appreciate, in FIG. 5B, the selection of the state feedback gain matrices would make the dynamics of the closed-loop 550' as fast as possible (i.e., by assigning all the "poles" of the model $P_m$ to zero for the discrete-time sampled-data case) and the input-output relationship completely decoupled with unity steady-state gain. This constitutes a "causal" inversion of the process model $P_m$, because the output of the state feedback loop 550' in FIG. 5B would follow exactly the loop input command 520, but with units of time delay equal to the order of the process model (which is 1 in this case). This is, however, exactly what a realizable, causal inversion 504 of block 550 in FIG. 5A would accomplish. The mathematical comparability between blocks 550 and 550' is thus established.

Therefore, block 550 in FIG. 5A can be viewed as a (model) state feedback inner loop similar to block 226 of FIG. 2 but with an exception. The exception is that in block 550 (or block 550') only the model state $X_m$ is fed back, not the true process state X as is the case in block 226 of FIG. 2. However, by adding the filtered state error, $E=X-X_m$, to the model state, $X_m$, at the input of the feedback gain block 554, embodiment 550' constitutes a true state feedback loop. Adding E at the input of gain block 554, labelled $A_m$, constitutes adding $A_m * E$, downstream of the gain block 554, or alternately, contributing to adder 562 subtractively. Since comparability between embodiment 550' and block 550 has been established, by contributing $A_m * E$ subtractively to the input of block 550, FIG. 5A becomes true state feedback (with an integral "outer" loop). The use of filtered $E_F$ in FIG. 5A reduces noise and increases robustness. Thus, FIG. 5A illustrates that the FIG. 4B control portion 456 of controller 408, (labelled as $Q_{NEW}$ in FIG. 4A), combines state feedback and an IMC structure.

In operation, the control systems illustrated in FIG. 4A–5B provide both rapid disturbance rejection and long-term system stability and operability by combining internal model control feedback and state feedback in the same system. Correcting for the effect of external disturbances and for model mismatches, the filtered state error vector $E_F$ is fed to the integrally controlled loop 522 in FIG. 5A for minimizing long-term process variability, and is fed through path 468 to bypass the integral control 502 for rapid external disturbance rejection.

FIG. 6A illustrates a functional block diagram of an exemplary alternate embodiment of a control system according to the present invention. FIG. 6A illustrates an internal model control (IMC) system 600 which incorporates state feedback. The dynamic process has long time delay and has been broken down into two components in FIG. 6A: a gain component 604, labelled G, and a process delay component 606, labeled D. A predictive model of the process is also broken down into two components: a predictive gain component 608, labelled $G_m$; and, a predictive process delay component 610, labeled $D_m$. The FIG. 6A embodiment further includes a low pass filter 612, labelled F, and a controller 602, labelled $Q_{NEW}$. As illustrated, the gain component 604 and the delay component 606 are in parallel with the predictive gain component (i.e., the gain model) 608 and predictive delay component 610 (i.e., the delay model). In FIG. 6A, the output 616 of delay component 606 is the state vector X, and the output 620 of delay component 610 is the predicted state vector $X_m$. The control input 634 to gain components G and $G_m$ is the control vector U. The control input 634 is derived from a setpoint input 628, labelled R.

As illustrated in FIG. 6A, the modelled state vector $X_m$ from delay component 610 is subtracted at comparator 622 from the state vector X to generate output 636 as state vector $E_x$, where $E_x = X-X_m$. This output vector $E_x$ is fed back through an outer feedback loop 638 to a filter 612. The filter output 626 is the filter error signal, labeled $E_F$, which is subtractively combined at the adder 630 with the setpoint input 628, labeled vector R. Controller 602 receives the output of adder 630 to produce the control input 634, labelled vector U. As described above, control vector U is input to both dynamic process 604 and process model 608. The filtered error signal $E_F$ is additionally fed directly to controller 602 via a bypass path 666 in a manner to be described more fully with respect to FIG. 6B. The inclusion of this bypass provides an ability to use state feedback in conjunction with internal model-based control, since it enables complete feedback of the state vector. That is, it enables the model state feedback signal $X_m$ to be added to any model mismatch that resulted in $E_F$ (which is derived from $X-X_m$) being a non-zero state vector.

FIG. 6B illustrates a functional block diagram of an exemplary embodiment of the FIG. 6A controller 602. The FIG. 6B controller includes a control portion 652, labelled C, and a predictive model of the dynamic process gain component 654, labeled $G_m$, which can be considered identical to the modelled gain component 608 of FIG. 6A. As illustrated in FIG. 6B, C is in the forward path of the controller and $G_m$ is in a feedback path of the controller. The output 656 of C is the controller output, labeled U. The output 658 of $G_m$ is the state feedback vector, labeled $X_m$. Output 656 is fed back via gain component 654 of the feedback loop 668 to an adder 662 which corresponds to adder 630 of FIG. 6A. In the adder 662, the state feedback vector $X_m$ is subtractively combined with the setpoint vector R and the filtered error signal 626, labeled $E_F$. The output 664 of adder 662 is input to control portion 652. The control portion 652 can be configured in the manner described with respect to control portion 456 (see FIGS. 4B, 5A and 5B). The filtered error signal 626 is additionally fed around comparator 662 directly to control portion 652 via bypass path 666. Thus, exemplary embodiments apply processes which both may or may not include time delays.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An apparatus for controlling a process comprising:
means for providing at least one control signal in response to at least one setpoint reference signal, said providing means including at least one integration function;

means for modeling a process to be controlled, and for outputting a predicted process output signal in response to said at least one control signal; and means for producing an error signal between a process output signal and said predicted process output signal, said error signal being a first input to said providing means to modify at least one setpoint reference signal, and said error signal being a second input to said providing means to modify an output of said integration function.

2. The apparatus according to claim 1, wherein said predicted process output signal is of an at least second order system.

3. The apparatus according to claim 1, wherein said predicted process output signal is of an at least third order system.

4. The apparatus according to claim 1, wherein said predicted process output signal is a predicted state vector of said process.

5. The apparatus according to claim 5, wherein said predicted state vector is of an at least second order system.

6. The apparatus according to claim 5, wherein said predicted state vector is of an at least third order system.

7. An apparatus for controlling a process having an order greater than one comprising:

means for providing at least one control signal in response to at least one setpoint reference signal, said providing means including at least one integration function;

means for modeling a process to be controlled, and for outputting a predicted process output signal in response to said at least one control signal; and means for producing an error signal between a process output signal and said predicted process output signal, said error signal being a state feedback vector of said process.

8. A method for controlling a process, comprising the steps of:

receiving at least one setpoint reference signal;

modeling a process to be controlled;

producing a predicted process output signal in response to said at least one setpoint signal;

producing both a control signal based on a time integral of said predicted process output signal and a control signal not based on a time integral of said predicted process output signal; and controlling said process using both said control signal based on a time integral of said predicted process output signal and said control signal not based on a time integral of said predicted process output signal.

9. A method for controlling a process having an order greater than one, comprising the steps of:

receiving at least one setpoint reference signal;

modeling a process to be controlled;

producing a predicted process output signal in response to said at least one setpoint signal;

producing an error signal between a process output signal and said predicted process output signal, said error signal being a state feedback vector of said process.

* * * * *